(12) United States Patent
Santhar et al.

(10) Patent No.: US 11,463,249 B2
(45) Date of Patent: Oct. 4, 2022

(54) FAIRNESS IN GAMING

(71) Applicant: International Business Machines Corporation, Armonk, NY (US)

(72) Inventors: Sathya Santhar, Ramapuram (IN); Sarbajit K. Rakshit, Kolkata (IN); Mukundan Sundararajan, Bangalore (IN); Balamurugaramanathan Sivaramalingam, Paramakudi (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 16/440,132

(22) Filed: Jun. 13, 2019

(65) Prior Publication Data

US 2020/0396064 A1   Dec. 17, 2020

(51) Int. Cl.
*G06F 7/58* (2006.01)
*H04L 9/08* (2006.01)
*H04L 9/30* (2006.01)
*G07F 17/32* (2006.01)

(52) U.S. Cl.
CPC .............. *H04L 9/088* (2013.01); *G06F 7/58* (2013.01); *G07F 17/3223* (2013.01); *G07F 17/3241* (2013.01); *G07F 17/3288* (2013.01); *H04L 9/30* (2013.01)

(58) Field of Classification Search
CPC ....... H04L 9/088; H04L 9/30; G07F 17/3223; G07F 17/3241; G07F 17/3288; G06F 7/58

USPC ......................................................... 713/171
See application file for complete search history.

(56) References Cited

U.S. PATENT DOCUMENTS

| 6,450,885 | B2 | 9/2002 | Schneier et al. |
| 7,218,739 | B2 | 5/2007 | Multerer et al. |
| 7,260,834 | B1 | 8/2007 | Carlson |
| 9,652,353 | B2 | 5/2017 | Kapur |
| 9,665,463 | B2 | 5/2017 | Anderson et al. |
| 2003/0229779 | A1 | 12/2003 | Morais et al. |

(Continued)

FOREIGN PATENT DOCUMENTS

| EP | 1808833 A1 | 7/2007 |
| EP | 2814009 A1 | 12/2014 |

OTHER PUBLICATIONS

Chen, I-TE, "Random Numbers Generated from Audio and Video Sources", Research Article, Mathematical Problems in Engineering, vol. 2013, Article ID 285373, Mar. 21, 2013, 8 pages, <https://www.hindawi.com/journals/mpe/2013/285373/>.

(Continued)

*Primary Examiner* — Jay Trent Liddle
*Assistant Examiner* — Ryan Hsu
(74) *Attorney, Agent, or Firm* — Donald J. O'Brien

(57) ABSTRACT

Embodiments are disclosed for fairness in gaming. The techniques include generating a public-private key pair for a bet with a gaming application. The techniques further include encrypting the bet using the generated public-private key pair. Additionally, the techniques include providing the encrypted bet to the gaming application. The techniques also include providing a private key of the public-private key pair in response to a notice from the gaming application indicating whether the bet is won.

17 Claims, 6 Drawing Sheets

(56) References Cited

U.S. PATENT DOCUMENTS

| | | | | |
|---|---|---|---|---|
| 2004/0015442 A1* | 1/2004 | Hmlinen | ............. | G07F 17/3241 |
| | | | | 705/50 |
| 2005/0221889 A1* | 10/2005 | Dupray | ................ | H04L 9/0833 |
| | | | | 463/29 |
| 2009/0300363 A1* | 12/2009 | Hamalainen | ........ | G07F 17/3288 |
| | | | | 713/178 |
| 2014/0364187 A1* | 12/2014 | Chang | ................ | G07F 17/3288 |
| | | | | 463/17 |
| 2019/0130698 A1* | 5/2019 | Simons | ................... | G06F 21/32 |

OTHER PUBLICATIONS

Unknown, "RSA Algorithm in Cryptography", GeeksforGeeks—A Computer Science Portal for Geeks, printed Apr. 1, 2019, 6 pages, <https://www.geeksforgeeks.org/rsa-algorithm-cryptography/>.

Mell et al., "The NIST Definition of Cloud Computing", Recommendations of the National Institute of Standards and Technology, Sep. 2011, 7 pages.

\* cited by examiner

FAIRNESS IN GAMING

BACKGROUND

The present disclosure relates to gaming applications, and more specifically, to gaming application fairness.

Fairness in gaming application can be tied to the use of random number generation. Random number generation can be part of online or other computer games where the random number can be used to provide an output that is fair to any of the players. The random number generated can be associated to different elements of a game—card, dice, symbol etc. For example, online card games can associate each card in a standard deck with a number between 1 and 52. Thus, by assigning cards to players based on a random number generated between 1 and 52, the distribution of cards can be perceived as fair.

SUMMARY

Embodiments are disclosed for fairness in gaming. The techniques include generating a public-private key pair for a bet with a gaming application. The techniques further include encrypting the bet using the generated public-private key pair. Additionally, the techniques include providing the encrypted bet to for the gaming application. The techniques also include providing a private key of the public-private key pair in response to a notice from the gaming application indicating whether the bet is won.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
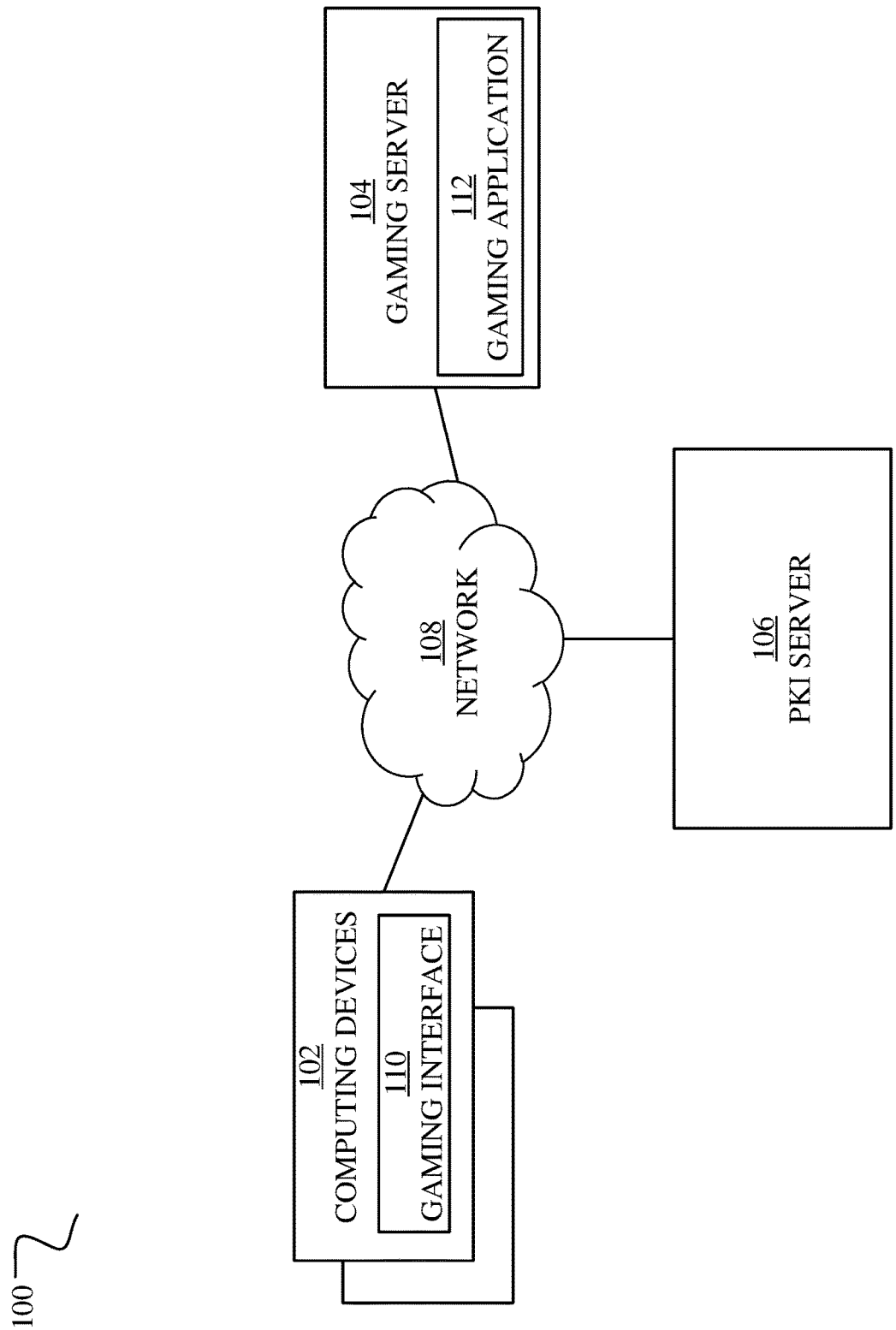
FIG. 1 depicts a block diagram of a network environment for fairness in gaming, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

While current systems may use random number generation for fairness in gaming, there can be problems with this approach. For example, the random number that is generated can, in fact, be based on a number generating function that has a seed value and a period of repetition. The seed value may be input to an algorithm that generates a repeating sequence of numbers based on the seed value. Thus, numbers generated in this way may not actually be random. Rather, such numbers can be considered "pseudo random." Accordingly, an unfair game can predetermine an output that is favorable to the game owner, through reverse engineering, for example. As such, if the unfair game can predetermine that a specific "random number" (used for a game result) favors the game owner, the unfair game can determine the seed value and the point in the sequence that produces the predetermined "random number." Further, the unfair game can thus input the determined seed value into the random number generator, and repeat the random number generation until the predetermined number is generated. In this way, the unfair game can ensure the game result favors a particular player or the game owner.

However, there are independent auditing companies that can monitor games for a limited time periods to validate whether numbers are generated randomly. Unfortunately, from the perspective of the auditing system, the random number generator function is a black box (an unknown) thus, providing ways that the unfair game owner can still influence the random number generation. For example, the unfair game can ensure the random numbers generated follow a normal distribution with mean of 0 (indicating statistical randomness), while still ensuring the game owner wins in the long run. Further, independent companies can specialize in testing online gaming systems, which can be costly, or implicate regulatory issues.

Random number generators can generate a sequence of integers by the example recurrence shown in FORMULA 1:

$X_0$=given;

$$X_{n+1} = P_1 X_n + P_2 \pmod{N} \; n=0,1,2,\ldots \quad (*) \qquad \text{FORMULA 1}$$

In FORMULA 1, the parameters, $P_1$, $P_2$, and n determine the characteristics of the random number generator, and the choice of $X_0$ (the seed) can predetermine the particular sequence of random numbers generated. Thus, if the random number generator is run with the same values for parameters $P_1$ and $P_2$, and the same seed, $X_0$, the random number generator can generate a sequence that is the same as a previous sequence. Hence, random numbers generated in this way can be referred to as pseudo random numbers, because such random numbers are deterministic and periodic.

There are some random number generators that provide non-deterministic, non-periodic random numbers. Such random number generators can generate random numbers based on seemingly random phenomena such as, for example, rolling dice, flipping coins, running a flip-flop circuit or oscillator, and measuring electromagnetic waves, thermal noise, and atmospheric noise. For example, a cryptographically secure random number generator, as might be used for generating encryption keys, works by gathering entropy—that is, unpredictable input—from a source which other people can't observe. Such random number generators can produce an output which is retrieved by a gaming system through an application programming interface (API). However, the API can be a black box. Hence, such approaches may not be transparent. Thus, without auditing by independent, third-party testers, such random number generators may not provide assurance to participants (or players) of the game that the random number generation is fair.

Accordingly, embodiments of the present disclosure can counter potentially pseudo random number generation with encrypted bets or plays by the games' players. Hence, even if the game owner/runner/operator can predetermine the random number generation, the players control access to the bets, or plays, thus preventing the game owner/runner/operator from predetermining a random number generation that can undermine potential winning bets, or plays, in the game.

Referring now to FIG. 1, which is a block diagram of a network environment 100 for fairness in gaming, in accordance with embodiments of the present disclosure. The network environment 100 includes computing devices 102, gaming server 104, and Public-Key Infrastructure (PKI) server 106, in communication over a network 108. The computing devices 102 may be any of various types of electronic devices having a computer processor, computer memory, and the like. The computing devices 102 may include, for example, desktop computers, laptop computers, tablets, smartphones, and the like. According to embodiments of the present disclosure, the computing devices can include a gaming interface 110. The gaming interface 110 can be a computer application that provides a user interface that enables a player to play a gaming application 112 that is hosted by the gaming server 104. Further, the gaming interface 110 can enable the selection of bets, or game plays, during the game. For example, for a dice game, the gaming interface 110 can enable the entering of a bet amount and the selection of a desired dice roll result. Additionally, the gaming interface 110 can encrypt the bet selection before providing the bet to the gaming application 112 for evaluation. By encrypting the bet selection, the gaming interface 110 can prevent an unfair game from predetermining a game result that can favor a specific player, or the game owner. According to embodiments of the present disclosure, the gaming interface 110 can request a public-private key pair from the PKI server 106. Additionally, the gaming interface 110 can encrypt the bet using the public-private key pair provided by the PKI server 106.

The gaming server 104 can be a hardware or software server that services requests to play the gaming application 112. The gaming application 112 can be a computer application that includes the computer logic configured to control game states, apply the rules of a game, and track credits/points/prizes that a player accumulates from game play. In some embodiments, the gaming application 112 can use a random number generator (not shown) to determine game plays or results. For example, the gaming application 112 can be a dice game, and thus use the random number generator to generate numbers for dice rolls. Further, once a game play takes place, e.g., the gaming application 112 rolls the dice, the gaming application 112 can provide the result of the game play to the gaming interface 110. Accordingly, the gaming interface 110 can compare the result to the bet selection to determine if the bet wins. If the bet wins, the gaming interface 110 can provide the public-private key pair for the gaming application 112 to decrypt the bet and ensure the bet is won. The gaming application 112 can thus associate any credits or prizes for the winning bet with the particular computing device 102 from which the winning bet is placed.

Figure 2:
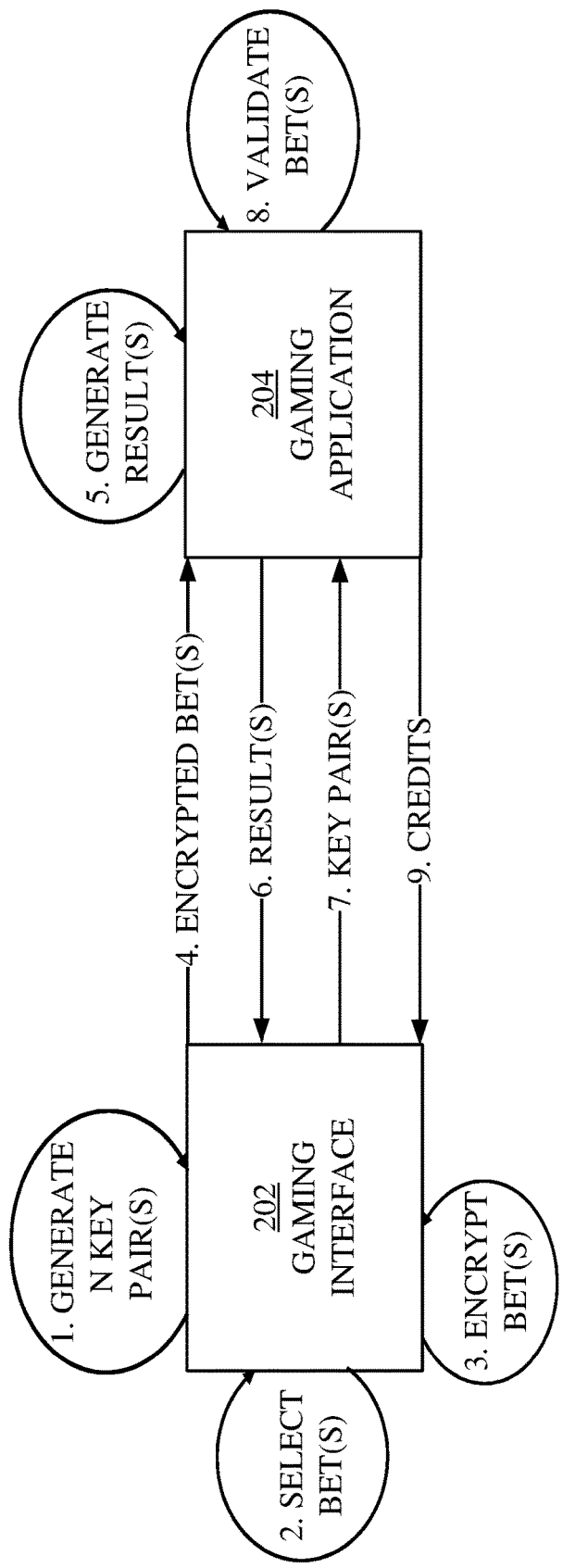
FIG. 2 depicts a message flow diagram for fairness in gaming, in accordance with embodiments of the present disclosure.

Referring now to FIG. 2, which is a message flow diagram of a method 200 for fairness in gaming, in accordance with embodiments of the present disclosure. The method 200 can be performed by a gaming interface 202 and gaming application 204. The gaming interface 202 and gaming application 204 can be similar to the gaming interface 110 and gaming application 112 described with respect to FIG. 1. The method 200 for fairness in gaming includes operations 1 through 9. At operation 1, the gaming interface 202 can generate n public-private key pairs, where n is the number of bets that are selected using the gaming interface 202. Similarly, n can also represent the number of fair play outputs, e.g., dice rolls, that are generated by the gaming application 204.

At operation 2, the gaming interface 202 can be used to select one or more bets. For example, in a dice roll game, the gaming interface 202 can enable an end user to select points between 2 and 12 for a desired result of rolling two dice. The gaming interface 202 can enable the user to place more than one bet.

At operation 3, the gaming interface 202 can encrypt the selected bet(s) using public-private key pair(s). For each selected bet, the gaming interface 202 can request the public-private key pair from a PKI server, such as the PKI server 106, described with respect to FIG. 1.

At operation 4, the gaming interface 202 can send the encrypted bet(s) to the gaming application 204. By sending the encrypted bet(s) to the gaming application 204, the gaming application 204 can ensure that the bet does not change between the time the bet is placed and the time when the game result is determined. Further, because the bet(s) is/are encrypted, the gaming application 204 may not be able to identify the bet(s) without the public-private key pair used for the encryption.

At operation 5, the gaming application 204 can generate the result(s) for a game play. For example, the gaming application 204 can use a random number generator to determine the results of rolling two dice.

At operation 6, the gaming application 204 can send the result(s) of the game play for the gaming interface 202. In this way, the gaming interface 202 can present the result(s) to an end user. Further, the gaming interface 202 can determine if the bet matches the result, i.e., whether the selected bet is a winner.

At operation 7, the gaming interface 202 can send the public-private key pair(s) for the bets to the gaming application 204. By providing the public-private key pair, the gaming interface 202 can enable the gaming application 204 to determine whether the encrypted bet(s) is/are winner(s).

At operation 8, the gaming application 204 can validate the bet(s). In other words, the gaming application 204 can decrypt the encrypted bet(s) with the private key(s) of the public-private key pair provided by the gaming interface 202. Once decrypted, the gaming application 204 can determine whether the decrypted bet(s) is/are winner(s). Further, the gaming application 204 can re-encrypt the decrypted number to ensure the re-encrypted bet matches the encrypted bet(s) originally sent by the gaming interface 202. If there is not a match, the gaming application 204 can determine that the bet(s) is/are not valid and reject the bet.

However, if the gaming application 204 determines the bet is valid, at operation 9, the gaming application 204 can provide credits resulting from a winning bet to the gaming interface 202. For example, if the end user bets fifty game credits on a winning dice roll, the gaming application 204 can provide the fifty game credits to the gaming interface 202. As the combination of 4 parameters—public key, private key, selected bet and encrypted bet can be unique, the gaming application 202 can verify the genuineness of the player and pass on the credits for winning the bet.

According to embodiments of the present disclosure, the public-private key pairs can be generated for each cycle in the game to increase the randomness of the output produced and to avoid cryptographic issues, such as breaking the public-private keys. Additionally, to further increase randomness, the number and length of the public-private keys can be increased so multiple key pairs can be associated with one fair play output, or bet.

When there are relatively large numbers of players, the same process can be repeated for each player so the public-private key pair generated for one player has no overlap with the public-private key pair generated for another player. In this way, transparency can be established between the gaming application 204 and the player operating the gaming interface 202. Further, cheating/misuse by either the player or the gaming application 204 can be prevented.

Figure 3:
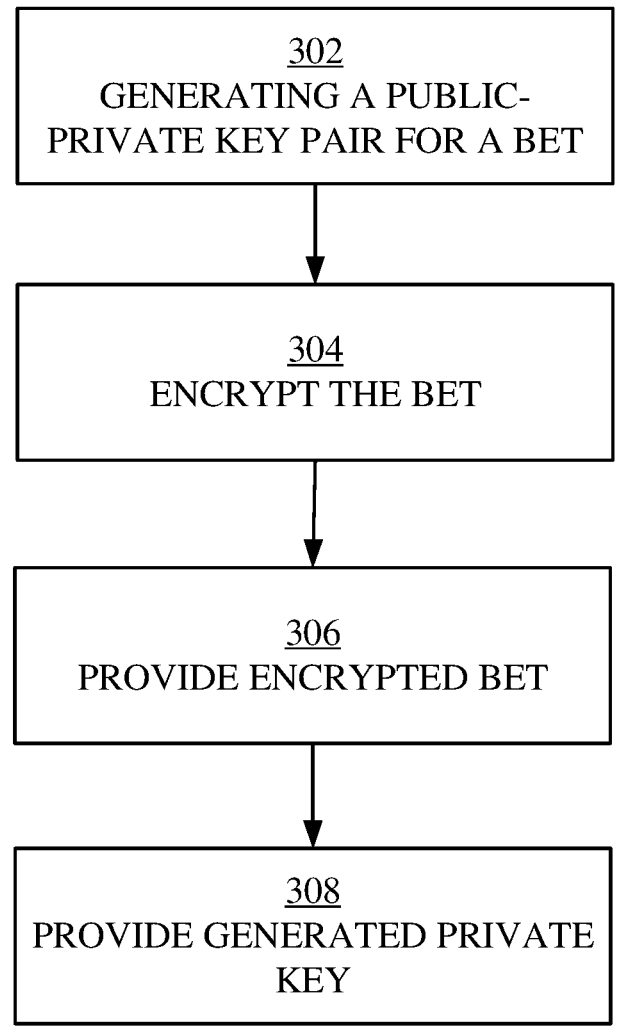
FIG. 3 depicts a flowchart of a method for fairness in gaming, in accordance with embodiments of the present disclosure.

Referring now to FIG. 3, which is a flowchart of a method 300 for fairness in gaming, in accordance with embodiments of the present disclosure. The method 300 can be performed by a gaming interface, such as the gaming interface 110 and gaming interface 202 described with respect to FIGS. 1-2.

At block 302, the gaming interface 110 can generate a public-private key pair for each bet selected with the gaming interface 110. For example, in a dice rolling game, which produces outputs of 1 to 6, a player can select any of the potential outputs. Accordingly, the gaming interface 110 can request a public-private key pair from a PKI server, such as the PKI server 106 described with respect to FIG. 1.

At block 304, the gaming interface 110 can encrypt the bet. More specifically, the gaming interface 110 can encrypt the bet using the requested public-private key pair.

At block 306, the gaming interface 110 can provide the encrypted bet for the gaming application 112. For example, the gaming interface 110 can send the encrypted bet to the gaming application 112. In this way, the gaming application can ensure the player cannot change the bet after the result is determined.

At block 308, in response to the gaming application 112 generating a result of a game play, the gaming interface 110 can provide the private key for the bet to the gaming application 112. Accordingly, the gaming application 112 can decrypt the encrypted bet to determine whether the bet is a winner. According to embodiments of the present disclosure, the gaming interface 110 can provide the public key of the public-private key pair to the gaming application 112. In this way, the gaming application 112 can re-encrypt the decrypted bet to ensure a match against the original encrypted bet. If there is no match, the gaming application 112 can reject the bet.

In this way, the method 300 can increase the fairness of output produced by gaming applications 112 with the help of asymmetric cryptographic keys. Additionally, the method 300 can provide a distributed system of online gaming with the fairness of the produced output controlled by the gaming interface 110 and the end users.

Advantageously, no participants, including the gaming host organization, can control and manipulate game play results. Additionally, the method 300 can provide transparency. In other words, each participant can be involved in, and supervise, each phase of result generation, and verify the result. Further, the method 300 can provide efficiency over other approaches without the additional cost of hiring an independent third party to certify the fairness of a potentially pseudo random number generator.

Figure 4:
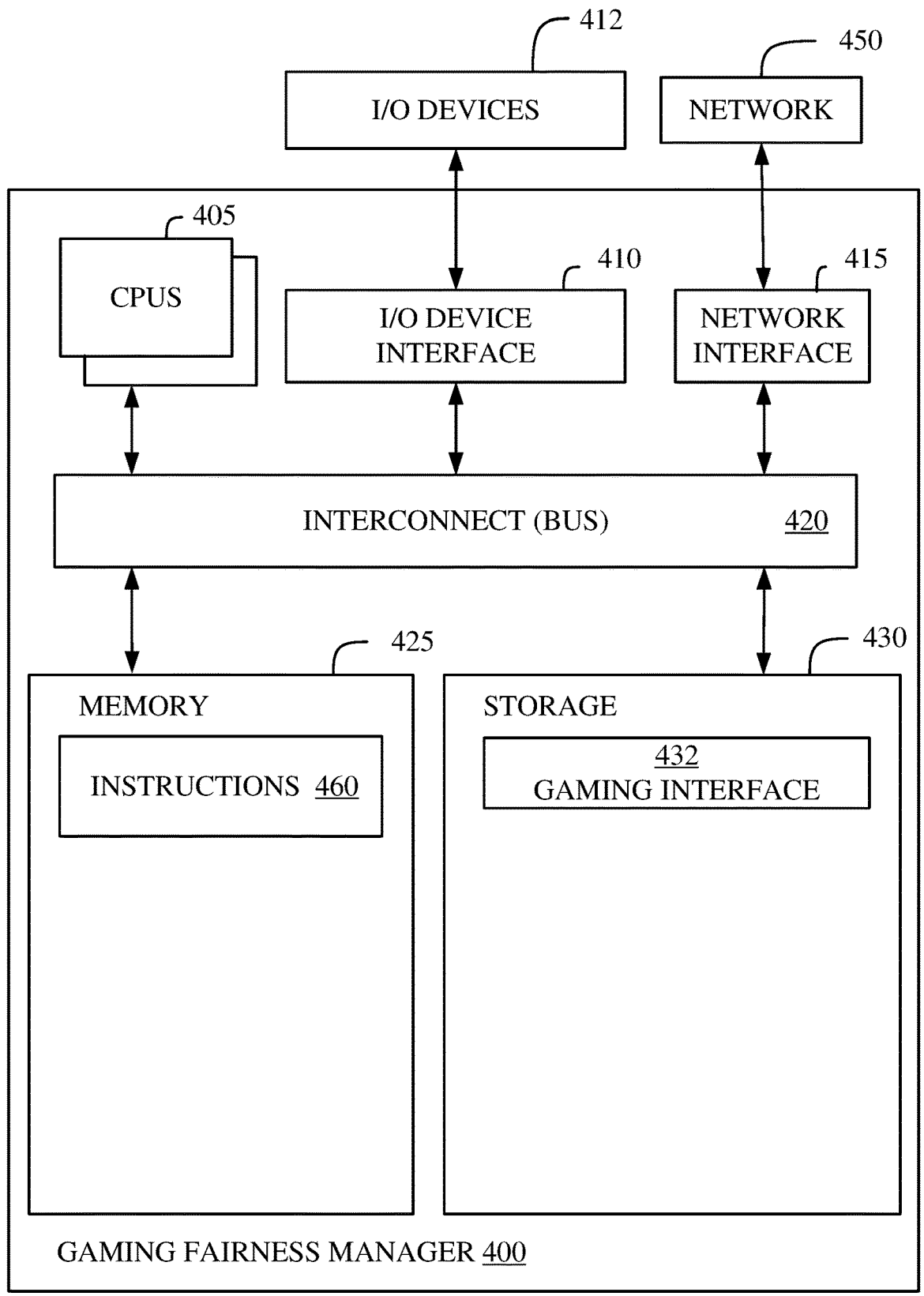
FIG. 4 depicts a block diagram of an example gaming fairness manager, in accordance with embodiments of the present disclosure.

Referring now to FIG. 4, illustrated is a block diagram of an example gaming fairness manager 400, in accordance with embodiments of the present disclosure. In various embodiments, the gaming fairness manager 400 can perform the method described in FIG. 3 and/or the functionality discussed in FIGS. 1-2. In some embodiments, the gaming fairness manager 400 provides instructions for the aforementioned method and/or functionalities to a client machine such that the client machine executes the method, or a portion of the method, based on the instructions provided by the gaming fairness manager 400. In some embodiments, the gaming fairness manager 400 comprises software executing on hardware incorporated into a plurality of devices.

The gaming fairness manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the gaming fairness manager 400 via the I/O device interface 410 or a network 450 via the network interface 415.

In some embodiments, the memory 425 stores instructions 460 and the storage 430 stores a gaming interface 432. However, in various embodiments, the instructions 460 and gaming interface 432 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, any of the method of FIG. 3 and/or any of the functionality discussed in FIGS. 1-2. The gaming interface 432 can be a computer application that presents and operates the end user interface to a gaming application that may reside on a gaming server (not shown).

In various embodiments, the I/O devices 412 include an interface capable of presenting information and receiving input. For example, I/O devices 412 can present information to a user interacting with gaming fairness manager 400 and receive input from the user.

The gaming fairness manager 400 is connected to the network 450 via the network interface 415. Network 450 can comprise a physical, wireless, cellular, or different network. In some embodiments, the gaming fairness manager 400 can be a multi-user mainframe computer system, a single-user system, or a server computer or similar device that has little or no direct user interface but receives requests from other computer systems (clients). Further, in some embodiments, the gaming fairness manager 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary gaming fairness manager 400. In some embodiments, however, individual components can have greater or lesser complexity than as represented in FIG. 4, components other than or in addition to those shown in FIG. 4 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
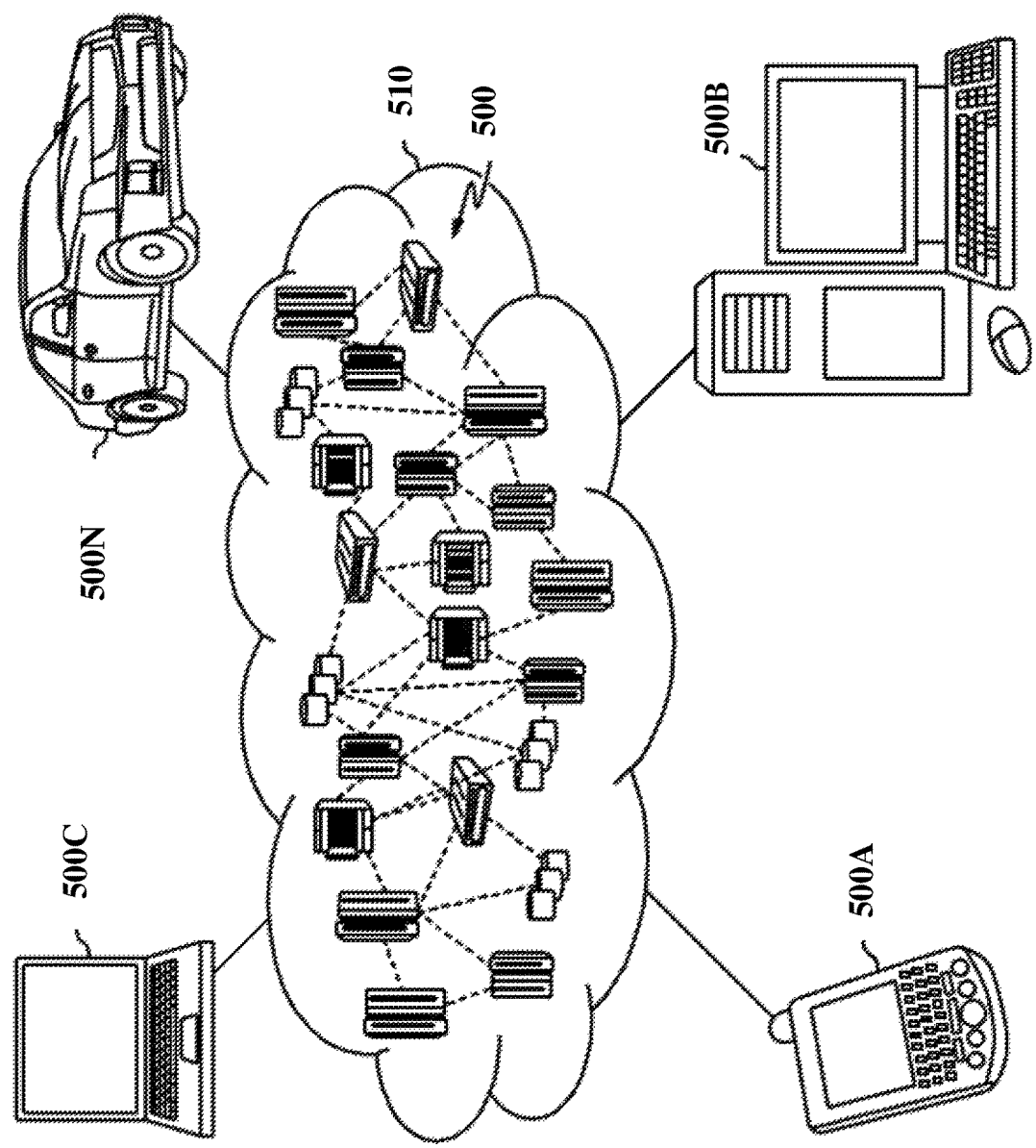
FIG. 5 depicts a cloud computing environment, according to some embodiments of the present disclosure.

Referring now to FIG. 5, which depicts a cloud computing environment 510, according to some embodiments of the present disclosure. As shown, cloud computing environment 510 includes one or more cloud computing nodes 500. The cloud computing nodes 500 can perform the method described in FIG. 3 and/or the functionality discussed in FIGS. 1-2. Additionally, cloud computing nodes 500 can communicate with local computing devices used by cloud consumers, such as, for example, personal digital assistant (PDA) or cellular telephone 500A, desktop computer 500B, laptop computer 500C, and/or automobile computer system 500N. Further, the cloud computing nodes 500 can communicate with one another. The cloud computing nodes 500 can also be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
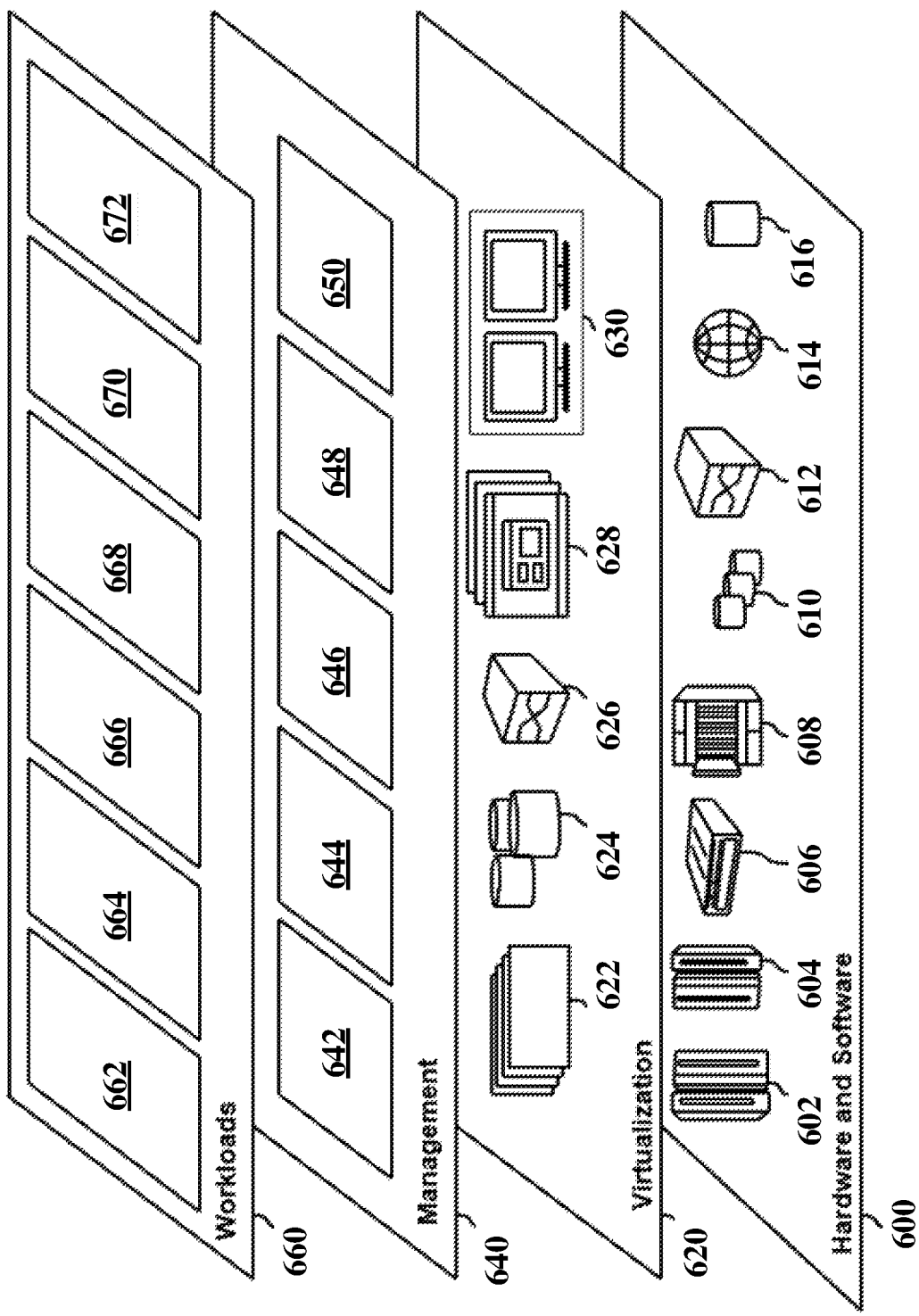
FIG. 6 depicts abstraction model layers, according to some embodiments of the present disclosure.

Referring now to FIG. 6, which depicts abstraction model layers provided by cloud computing environment 510 (FIG. 5), according to some embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and gaming fairness manager 672.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
  providing a user interface that:
    enables a player to play a gaming application that is hosted by a gaming server;
    enables a selection of a bet during a game of the gaming application; and
    prevents the gaming application from predetermining a game result that favors a specific player by:
      generating a public private key pair for a betting transaction comprising the bet;
      encrypting the betting transaction using the generated public-private key pair; and
      providing the encrypted betting transaction to the gaming application before a game play of the gaming application;
  receiving a result of a game play for the betting transaction;

determining that the bet of the betting transaction wins based on the result; and providing a private key of the generated public-private key pair to the gaming application in response to the determination.

2. The method of claim 1, further comprising presenting a user interface of the gaming application that accepts the bet.

3. The method of claim 1, wherein the public-private key pair is generated in accordance with a Public Key Infrastructure.

4. The method of claim 1, further comprising:
generating a plurality of public-private key pairs for a corresponding plurality of betting transactions with the gaming application;
encrypting the corresponding plurality of betting transactions using the generated plurality of public-private key pairs; and
providing the corresponding plurality of encrypted betting transactions to the gaming application.

5. The method of claim 4, further comprising providing a corresponding private key of the plurality of public-private key pairs in response to a notice from the gaming application indicating whether one of the corresponding plurality of betting transactions is won.

6. The method of claim 1, wherein the gaming application comprises a random number generator that is associated with the bet.

7. A computer program product comprising program instructions stored on a non-transitory computer readable storage medium, the program instructions executable by a processor to cause the processor to perform a method comprising:
providing a user interface that:
enables a player to play a gaming application that is hosted by a gaming server;
enables a selection of a bet during a game of the gaming application; and
prevents the gaming application from predetermining a game result that favors a specific player by:
generating a public-private key pair for a betting transaction comprising the bet;
encrypting the betting transaction using the generated public-private key pair; and
providing the encrypted betting transaction to the gaming application before a game play of the gaming application;
receiving a result of a game play for the betting transaction;
determining that the bet of the betting transaction wins based on the result; and
providing a private key of the generated public-private key pair to the gaming application in response to the determination.

8. The computer program product of claim 7, the method further comprising presenting a user interface of the gaming application that accepts the bet.

9. The computer program product of claim 7, wherein the public-private key pair is generated in accordance with a Public Key Infrastructure.

10. The computer program product of claim 7, the method further comprising:
generating a plurality of public-private key pairs for a corresponding plurality of betting transactions with the gaming application;
encrypting the corresponding plurality of betting transactions using the generated plurality of public-private key pairs; and
providing the corresponding plurality of encrypted betting transactions to the gaming application.

11. The computer program product of claim 10, the method further comprising providing a corresponding private key of the plurality of public-private key pairs in response to a notice from the gaming application indicating whether one of the corresponding plurality of betting transactions is won.

12. The computer program product of claim 7, wherein the gaming application comprises a random number generator that is associated with the bet.

13. A system comprising:
a computer processing circuit; and
a computer-readable storage medium storing instructions, which, when executed by the computer processing circuit, are configured to cause the computer processing circuit to:
provide a user interface that:
enables a player to play a gaming application that is hosted by a gaming server;
enables a selection of a bet during a game of the gaming application; and
prevents the gaming application from predetermining a game result that favors a specific player by:
generating a public-private key pair for a betting transaction comprising the bet;
encrypting the betting transaction using the generated public-private key pair; and
providing the encrypted betting transaction to the gaming application before a game play of the gaming application;
receive a result of a game play for the betting transaction;
determine that the bet of the betting transaction wins based on the result; and
provide a private key of the generated public-private key pair to the gaming application in response to the determination.

14. The system of claim 13, wherein the instructions, when executed by the computer processing circuit, are configured to cause the computer processing circuit to present a user interface of the gaming application that accepts the bet.

15. The system of claim 13, wherein the public-private key pair is generated in accordance with a Public Key Infrastructure.

16. The system of claim 13, wherein the instructions, when executed by the computer processing circuit, are configured to cause the computer processing circuit to:
generate a plurality of public-private key pairs for a corresponding plurality of betting transactions with the gaming application;
encrypt the corresponding plurality of bets using the generated plurality of public-private key pairs; and
provide the corresponding plurality of encrypted bets to the gaming application.

17. The system of claim 16, wherein the instructions, when executed by the computer processing circuit, are configured to cause the computer processing circuit to provide a corresponding private hey of the plurality of public-private key pairs in response to a notice from the gaming application indicating whether one of the corresponding plurality of betting transactions is won.

* * * * *